(12) United States Patent
Valve et al.

(10) Patent No.: US 7,689,248 B2
(45) Date of Patent: Mar. 30, 2010

(54) LISTENING ASSISTANCE FUNCTION IN PHONE TERMINALS

(75) Inventors: Päivi Valve, Tampere (FI); Leo Kärkkäinen, Helsinki (FI); Juha Backman, Espoo (FI); Jari Sjöberg, Kangasala (FI)

(73) Assignee: Nokia Corporation, Espoo (FI)

( * ) Notice: Subject to any disclaimer, the term of this patent is extended or adjusted under 35 U.S.C. 154(b) by 1150 days.

(21) Appl. No.: 11/238,078

(22) Filed: Sep. 27, 2005

(65) Prior Publication Data

US 2007/0082612 A1  Apr. 12, 2007

(51) Int. Cl.
*H04M 1/00* (2006.01)

(52) U.S. Cl. ........... 455/556.1; 455/41.2; 455/569.1; 455/575.2; 455/570; 455/563; 381/74; 381/370; 381/375; 379/38; 379/442; 704/225; 704/233

(58) Field of Classification Search ........... 455/41.2, 455/556.1, 569.1, 575.2, 570, 563; 381/74, 381/370, 1, 375; 379/38, 442; 704/233, 704/225

See application file for complete search history.

(56) References Cited

U.S. PATENT DOCUMENTS

| | | | |
|---|---|---|---|
| 5,086,464 A | 2/1992 | Groppe | |
| 5,721,783 A | 2/1998 | Anderson | |
| 5,828,991 A | 10/1998 | Skiena et al. | |
| 5,978,689 A * | 11/1999 | Tuoriniemi et al. | ...... 455/569.1 |
| 5,995,590 A | 11/1999 | Brunet et al. | |
| 6,041,130 A * | 3/2000 | Goss | ........... 381/374 |
| 6,381,308 B1 | 4/2002 | Cargo et al. | |
| 6,449,593 B1 * | 9/2002 | Valve | ........... 704/233 |
| 6,707,910 B1 * | 3/2004 | Valve et al. | ........ 379/388.06 |
| 6,873,862 B2 * | 3/2005 | Reshefsky | ........ 455/569.1 |
| 6,937,980 B2 * | 8/2005 | Krasny et al. | .......... 704/231 |
| 6,987,992 B2 * | 1/2006 | Hundal et al. | ........ 455/569.1 |
| 7,016,836 B1 * | 3/2006 | Yoda | ........... 704/233 |
| 7,095,981 B1 * | 8/2006 | Voroba et al. | ........ 455/41.2 |
| 7,107,010 B2 * | 9/2006 | Heinonen et al. | ...... 455/41.2 |
| 7,251,336 B2 * | 7/2007 | Amiri et al. | ............ 381/92 |
| 7,343,284 B1 * | 3/2008 | Gazor et al. | .......... 704/226 |
| 7,400,712 B2 * | 7/2008 | August | ........ 379/88.01 |
| 7,478,041 B2 * | 1/2009 | Ichikawa et al. | ........ 704/233 |
| 2005/0141731 A1 * | 6/2005 | Hamalainen | ......... 381/94.3 |
| 2005/0147258 A1 * | 7/2005 | Myllyla et al. | ........ 381/71.11 |
| 2005/0149320 A1 * | 7/2005 | Kajala et al. | .......... 704/206 |
| 2006/0116107 A1 * | 6/2006 | Hulvey | ........... 455/411 |
| 2006/0120537 A1 * | 6/2006 | Burnett et al. | ........ 381/71.6 |
| 2007/0230712 A1 * | 10/2007 | Belt et al. | ........ 381/71.1 |

* cited by examiner

*Primary Examiner*—Marceau Milord

(57) ABSTRACT

The specification and drawings present a new method, apparatus and software product for listening assistance to a user of a phone terminal with a headset or a hearing aid for selective listening of a local acoustic source in a noisy environment by said user utilizing a combination of said phone terminal and said headset. The method for the listening assistance comprises of placing the phone terminal near a desired local acoustic source, switching a mode of the phone terminal to a listening mode, providing to the headset or to the hearing aid a signal (e.g., a wireless signal) generated by the phone terminal in response to an acoustic signal from the local acoustic source, and providing to the user an output acoustic signal generated by the headset or by the hearing aid in response to that signal thus providing said listening assistance to the user.

26 Claims, 4 Drawing Sheets

LISTENING ASSISTANCE FUNCTION IN PHONE TERMINALS

TECHNICAL FIELD

This invention is related to the personal communication devices, and more specifically to using for listening assistance to a user of the personal communication devices.

BACKGROUND ART

Many hearing challenged people, with or without hearing aids, experience difficulties hearing in noisy situations (e.g., face-to-face communications in restaurants with a lot of competing voices). Even typical hearing aids do not alleviate the problem, since in noisy situations the hearing aids amplify not only the desired signal but also the ambient noise. There are also situations, where the speech is simply too faint to be heard without any assistive listening (or listening assistance) devices regardless whether the person (listener) has a hearing impairment or not.

Assistive listening devices are commonly used to alleviate the problem. The main idea behind assistive listening devices is to amplify one signal of interest with respect to a background noise by bringing the microphone closer to the desired source. The improvements in a signal-to-noise ratio can, in practical situations, be as high as 15 to 20 dBs (decibels). The assistive listening devices can be divided into four groups:

1. Personal listening systems, which are ideal for use in small group situations, car trips, noisy restaurants, or any place where there is a distracting environmental noise. There are wired and wireless versions and they typically consist of a microphone unit to be positioned closer to the talker and a headphone (or earphone).

2. FM systems, which are ideal for situations which require a higher distance of operation, such as classrooms, meetings, conferences and trainings. They consist of, e.g., a microphone unit and a small body worn transmitter to be given to a lecturer, and a receiver unit with headphones to be worn by a user. The receivers can also be used with a hearing aid (assuming the hearing aid has a T-coil switch and/or a direct audio input). The FM systems are much more expensive.

3. Group listening systems, which consist of one transmitter system and several receiver systems.

4. TV listening systems, where the transmitter connects directly to a TV/VCR audio output. For example, Sennheiser manufactures currently wireless headphones with an automatic gain control and a tone adjustment.

Hearing aids with directional microphones are useful by providing some spatial discrimination to the amplification, but the amount of SNR (signal-to-noise ratio) improvement is significantly lower than with aforementioned assistive listening devices.

DISCLOSURE OF THE INVENTION

A new method, apparatus and software product are presented for listening assistance to a user of a phone terminal (e.g., a mobile phone) with a headset for selective listening of a local acoustic source in a noisy environment by said user using a combination of said phone terminal and said headset. Alternatively, if the user of the mobile phone wears a hearing aid, the headset can be replaced by the hearing aid. The hearing aid can be connected to the mobile phone, e.g., through a loopset.

According to a first aspect of the invention, a method for a listening assistance to a user of a phone terminal with a headset or a hearing aid, comprises the steps of: placing the phone terminal near a local acoustic source; switching a mode of the phone terminal to a listening mode; providing to the headset an RF signal generated by the phone terminal in response to a microphone signal from a microphone or to microphone signals from corresponding K microphones of the phone terminal indicative of a local acoustic signal from the local acoustic source, wherein K is an integer of at least a value of one; and providing to a user an output acoustic signal by the headset or by the hearing aid in response to the RF signal thus providing the listening assistance to the user.

According further to the first aspect of the invention, the phone terminal may be wirelessly connected with the headset.

Further according to the first aspect of the invention, the phone terminal may be wirelessly connected with the hearing aid.

Still further according to the first aspect of the invention, the headset may provide a sidetone signal to the user for a feedback for controlling user's voice.

According further to the first aspect of the invention, the step of switching of the mode of the phone terminal to the listening mode may comprise: providing a listening command signal to a mode switch block of the phone terminal; and providing, in response to the listening command signal, a switching mode signal to an audio enhancement module of the phone terminal or to a listening audio enhancement module of the phone terminal and providing the listening command signal optionally: to a receiving and decoding module of the phone terminal, to the microphone or to an analog-to-digital converter of the phone terminal.

According still further to the first aspect of the invention, the step of providing to the headset the RF signal may comprise: providing a digital microphone signal or digital microphone signals by the analog-to-digital converter in response to the microphone signal or to corresponding microphone signals, respectively; providing an enhanced audio signal by an audio enhancement module or by a listening audio enhancement module in response to the digital microphone signal or to the digital microphone signals; and providing the RF signal by a terminal encoding and transmitting block in response to the enhanced audio signal. Further, the providing the enhanced audio signal by the audio enhancement module or by the listening audio enhancement module may comprise at least one step of: providing an AGC microphone signal by an automatic gain control block in response to the digital microphone signal; providing a noise suppressed microphone signal by a noise suppression (NS) block in response to the AGC microphone signal; and providing the enhanced audio signal by a dynamic range control (DRC) block in response to the noise suppressed microphone signal. Still further, the providing of the RF signal by the terminal encoding and transmitting block may comprise: providing an encoded enhanced audio signal by a terminal encoder in response to the enhanced audio signal; and providing the RF signal by an RF transmitter in response to the encoded enhanced audio signal. Yet still further, the terminal encoder may be a continuous variable slope delta modulation (CVSD) encoder or a sub-band codec (SBC) encoder. Still yet further, the continuous variable slope delta modulation (CVSD) encoder and/or the sub-band codec (SBC) encoder may use a BLUETOOTH protocol.

According further still to the first aspect of the invention, the step of providing to the user of the headset the output acoustic signal may comprise: providing a decoded audio signal by a headset receiving and decoding module of the headset in response to the RF signal; providing a digital audio signal by a digital-to-analog converter of the headset in response to the decoded audio signal, and providing the output acoustic signal by a speaker of the headset in response to the digital audio signal.

According yet further still to the first aspect of the invention, the providing the decoded audio signal by the headset receiving and decoding module may comprise: providing an audio receiver signal by an RF receiver in response to the RF signal; and providing the decoded audio signal by a terminal decoder in response to the audio receiver signal. Further, the headset decoder is a continuous variable slope delta modulation (CVSD) decoder or a sub-band codec (SBC) decoder. Still further, the continuous variable slope delta modulation (CVSD) decoder and/or the sub-band codec (SBC) decoder may use a BLUETOOTH protocol.

Yet still further according to the first aspect of the invention, the method may comprise the step of: switching the phone terminal to a phone mode back from the listening mode. Further, the switching between the listening mode and the phone mode may be provided by a mode switch block of the phone terminal, by a mode switch block of the headset or by both the mode switch block of the phone terminal and by the mode switch block of the headset.

According to a second aspect of the invention, a computer program product comprises: a computer readable storage structure embodying computer program code thereon for execution by a computer processor with the computer program code characterized in that it includes instructions for performing the steps of the first aspect of the invention indicated as being performed by any component or a combination of components of the phone terminal, the headset or the hearing aid.

According to a third aspect of the invention, a system for a listening assistance to a user of the system, comprises: a phone terminal, for placing near a local acoustic source, for switching to a listening mode, providing an RF signal in response to a microphone signal from a microphone or microphone signals from corresponding K microphones of the phone terminal indicative of a local acoustic signal from the local acoustic source, wherein K is an integer of at least a value of one; and a headset or a hearing aid, responsive to the RF signal, for providing to the user an output acoustic signal generated by the headset or the hearing aid in response to the RF signal, thus providing the listening assistance to the user.

According further to the third aspect of the invention, the phone terminal may be wirelessly connected with the headset.

Further according to the third aspect of the invention, the phone terminal may be wirelessly connected with the hearing aid.

Still further according to the third aspect of the invention, the headset may provide a sidetone signal to the user for a feedback for controlling user's voice.

According further to the third aspect of the invention, the phone terminal may use a BLUETOOTH protocol to encode the RF signal and the headset may use the BLUETOOTH protocol to decode the RF signal.

According to a fourth aspect of the invention, a phone terminal placed near a local acoustic source for a listening assistance to a user of the phone terminal, comprises: a mode switch block, responsive to a listening command signal for switching to a listening mode, for providing, in response to the listening command signal, a switching mode signal for switching to listening assistance mode; and at least one microphone, responsive to a local acoustic signal from the local acoustic source, for generating at least one microphone signal indicative of a local acoustic signal which is used by the phone terminal for providing an RF signal to a headset or to a hearing aid for providing the listening assistance to the user, wherein the RF signal is generated by the phone terminal using the switching mode signal.

According further to the fourth aspect of the invention, the phone terminal may further comprise: an analog-to-digital converter, responsive to the microphone signal, for providing a digital microphone signal; an audio enhancement module or a listening audio enhancement module, responsive to the digital microphone signal, responsive to the switching mode signal, for providing an enhanced audio signal; and a terminal encoding and transmitting block, responsive to the enhanced audio signal, for providing the RF signal.

Further according to the fourth aspect of the invention, the phone terminal, wherein the audio enhancement module may comprise: automatic gain control block, for providing an AGC microphone signal in response to the digital microphone signal; a noise suppression (NS) block, for providing a noise suppressed microphone signal in response to the AGC microphone signal; and a dynamic range control (DRC) block, for providing the enhanced audio signal in response to the noise suppressed microphone signal.

Still further according to the fourth aspect of the invention, the terminal encoding and transmitting block may comprise: a terminal encoder, for providing an encoded enhanced audio signal in response to the enhanced audio signal; and an RF transmitter, for providing the RF signal in response to the encoded enhanced audio signal. Further, the terminal encoder may be a continuous variable slope delta modulation (CVSD) encoder or a sub-band codec (SBC) encoder. Still further, the continuous variable slope delta modulation (CVSD) encoder or the sub-band codec (SBC) encoder may use a BLUETOOTH protocol.

The invention can be applied as a personal listening system in a mobile phone, e.g., with a negligible (software) cost by taking advantage of the readily available microphone and earpiece units, as well as the DSP resources in the mobile phone. Therefore the owner of the mobile phone with the listening assistance feature does not need to purchase a costly personal listening system, and/or to carry several pieces of equipment with him/her. Furthermore, the usage of the personal listening system implemented in mobile phones would be subtle and unnoticeable, and therefore appealing to some users.

Moreover, the invention provides the advantage over the prior art by the fact that the desired speech can be personalized for user hearing properties prior to feeding it to a user's ear, and thereby further improve the intelligibility of the desired speech.

BEST MODE FOR CARRYING OUT THE INVENTION

A new method, apparatus and software product are presented for listening assistance to a user of a phone terminal (e.g., a mobile phone) with a headset or a hearing aid or selective listening of a local acoustic source in a noisy environment by said user using a combination of the phone terminal and the headset or the hearing aid. According to an embodiment of the present invention, said phone terminal can be, e.g., a mobile phone, for example, wirelessly connected to the headset or the hearing aid using, e.g., a BLUETOOTH (BT) protocol, and the method for the listening assistance comprises of placing the phone terminal near a desired local acoustic source, switching a mode of the phone terminal to a listening mode, providing to the headset or the hearing aid a signal (e.g., a wireless signal) generated by the phone terminal in response to an acoustic signal from said local acoustic source, and finally providing to the user an acoustic signal generated by the headset or by the hearing aid in response to that signal thus providing said listening assistance to the user.

The invention relates to personalizing the personal communication device, e.g., a mobile phone, to meet the customer needs also in the field of hearing challenges. The invention can be utilized by mobile phone users who experience some degree of hearing challenges (e.g., related to aged hearing, hearing disabilities, etc.), or the invention can be utilized simply in extreme noise situations, which are challenging also for normal hearing people. This invention provides a feature to the mobile phone, which enables the hearing challenged user to use his or her mobile phone as an assistive listening device, or more specifically as a personal listening system, e.g., in nearby conversations in noisy situations.

The present invention can minimize an additional cost (e.g., software) by taking advantage of the readily available microphone and earpiece units, as well as the DSP resources in the mobile phones. Moreover, in the future, when multiple microphones may be used in the phone terminals, the mobile terminal will be able to pickup the voice of the conversation partner with improved SNR. Currently, the DSP resources in the mobile phone can be used to the audio processing technology, (e.g., Multiband Dynamic Range Controller, Automatic Volume Control, Noise Suppressor, etc.), can be used for additional boosting of the voice of the conversation partner, and improving the signal-to-noise ratio to improve intelligibility.

FIGS. 1 through 4 illustrate novelty and various implementation alternatives of the present invention.

Figure 1:
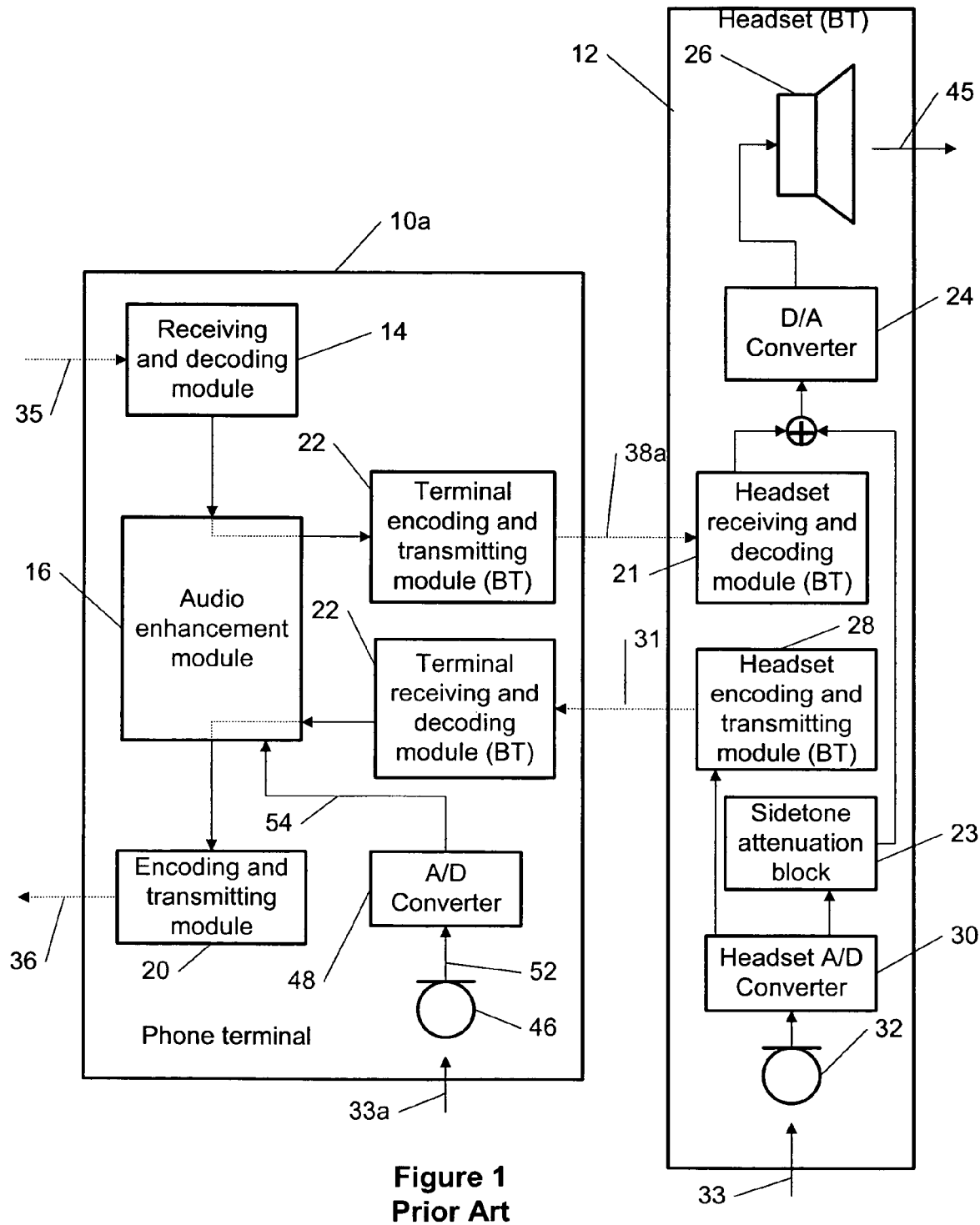
FIG. 1 is a block diagram showing signal processing in a phone terminal and a headset during a phone mode of operation (a phone call), according to the prior art.

FIG. 1 is a prior art example among others of a block diagram showing signal processing in a phone terminal 10a and a headset 12 during operation in a phone mode (e.g., during a phone call). The phone terminal (e.g., the mobile phone) 10a and the headset 12 are wirelessly connected and exchange RF signals 38a and 31 using, for example, a BLUETOOTH (BT) protocol. The phone terminal 10a typically comprises a receiving and decoding module 14 which receives an incoming call signal 35 with subsequent processing by an audio enhancement module 16 and by a terminal encoding and transmitting module 22 for generating the RF signal 38a and providing it to the headset 12. The RF signal 31 from the headset 12 is typically received and decoded by a terminal receiving and decoding module 22, then processed by the audio enhancement module 16 with further encoding and transmitting an outcoming call signal 36 to a network by an encoding and transmitting module 20. The RF signal 38a is received and decoded by a headset receiving and decoding module 21, then typically converted to an analog format by a digital-to-analog (D/A) converter 24 and further forwarded to a speaker 26 which provides an output acoustic signal 45 to a user's ear. The RF signal 31 is generated by picking an acoustic signal 33 using a headset microphone 32 with subsequent processing by a headset analog/digital (A/D) converter 30 and a headset encoding and transmitting module 28. The phone terminal 10a also typically contains its own microphone 46 (for providing a microphone signal 52) which can pick up an acoustic signal 33a which is subsequently processed by an analog/digital (A/D) converter 48 (which provides a digital microphone signal 54), by the audio enhancement module 16 and finally by the encoding and transmitting module 20 for providing an outgoing call signal 36. FIG. 1 also shows a sidetone attenuation block 23 which attenuates the output of the block 30 and provides an input to the block 24 and subsequently to the user, for providing to the user a feedback for controlling his/her voice.

Figure 2:
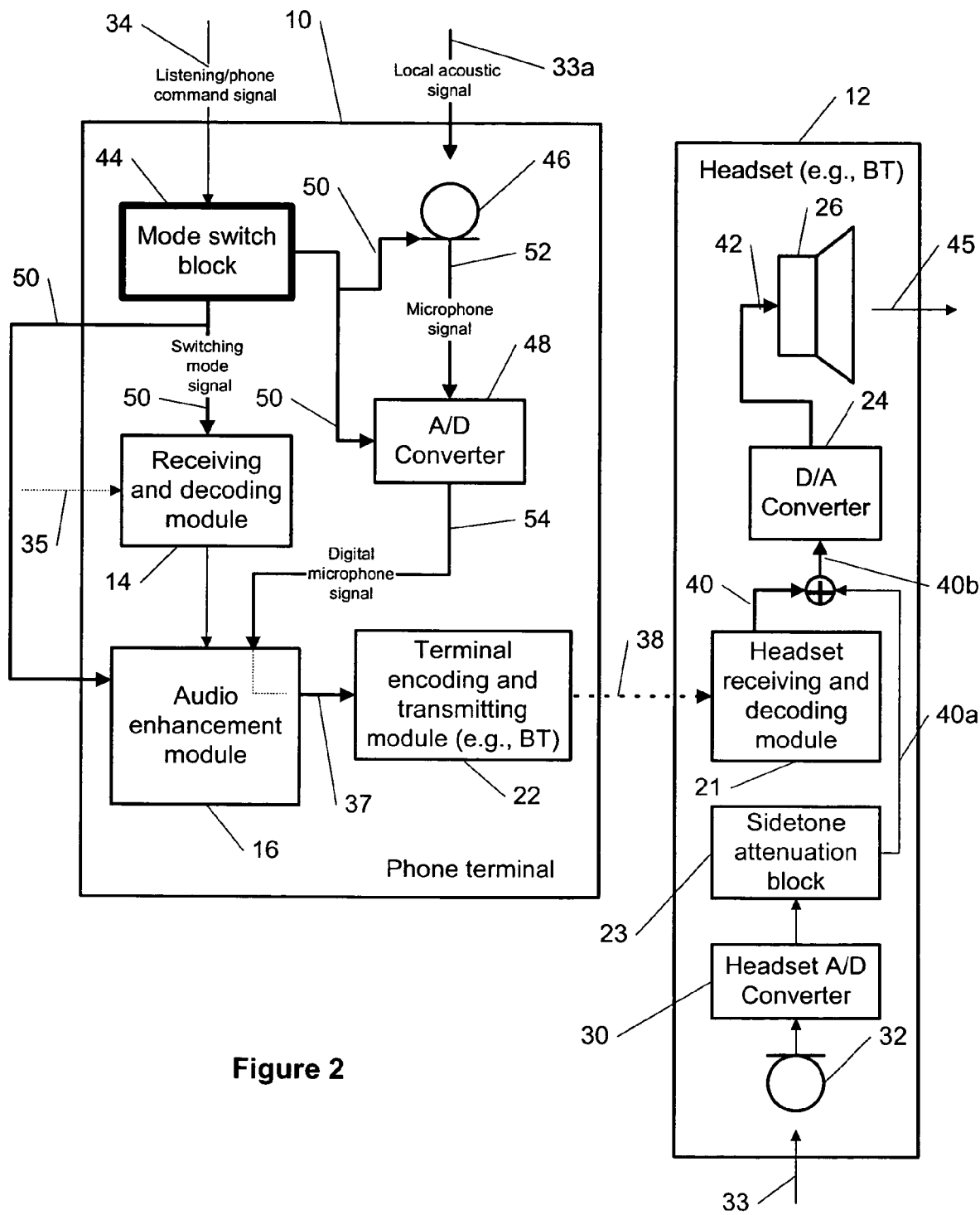
FIG. 2 is a block diagram showing signal processing in a phone terminal and a headset during and after switching to a listening assistance mode of operation, according to an embodiment of the present invention.

FIG. 2 is an example among others of a block diagram showing signal processing in a phone terminal 10 and a headset 12 during and after switching to a listening assistance mode of operation, according to an embodiment of the present invention. The main difference with the prior art phone terminal 10a of FIG. 1 is ability to switch to and support a listening assistance function. Indeed, a listening/phone command signal 34 (which can be provided, e.g., by a user of the phone terminal 10 through a user interface) is provided to a mode switch block 44 to switch back and forth between a phone mode (a normal mode of operation) and a listening assistance mode. In response to the listening/phone command signal 34, the mode switch block provides a switching mode signal 50. If the phone terminal 10 is switched to the listening assistance mode, the switching mode signal 50 is provided to the audio enhancement block 16 for processing the digital microphone signal 54 directly and for providing the enhanced audio signal 37 to the terminal encoding and transmitting module 22 which subsequently (after encoding) provides the RF signal 38 to the headset 12 thus facilitating the listening assistance, according to an embodiment of the present invention. The processing of the signal 38 by the headset 12 is similar to the processing of the signal 38a per the prior art shown in FIG. 1: in response to the RF signal 38, a decoded audio signal 40 is generated by a headset receiving and decoding module 21 followed by generating a digital audio signal 42 using a digital-to-analog converter 24 and finally providing the output acoustic signal 45 by a speaker 26 in response to said digital audio signal 42. Furthermore, the sidetone attenuation block 23 can attenuate the output of the block 30 and provide the sidetone attenuation signal 40a which is added to the decoded audio signal 40 thus providing a combined decoded audio signal 40b to the block 24 and subsequently to the user for providing a feedback for controlling his/her voice.

Moreover, when the phone terminal 10 is switched to the listening assistance mode, the switching mode signal 50 can be provided to the receiving and decoding module 14 for disabling of processing of the incoming call signal 35, and also optionally to the microphone 46 and to the A/D converter 48 for switching to/activating a local acoustic signal mode of operation as shown in FIG. 2. According to an embodiment of the present invention, the mobile terminal 10 is placed near a desired acoustic source and after switching to the listening assistance mode of operation, the microphone 46 picks up a local acoustic signal 33a which is then processed as described above.

Figure 3:
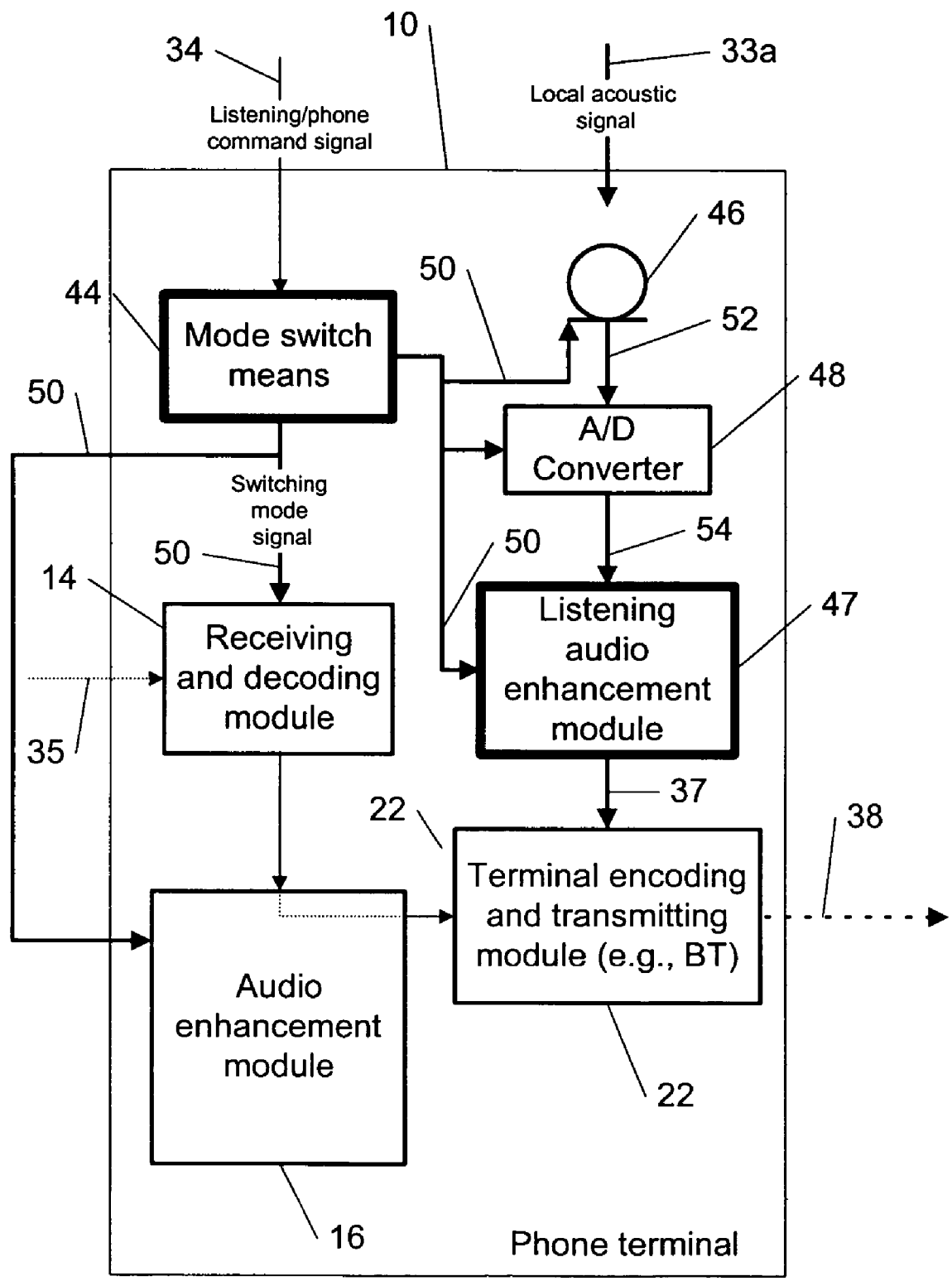
FIG. 3 is a block diagram showing alternative signal processing in a phone terminal during and after switching to a listening assistance mode of operation, according to an embodiment of the present invention.

FIG. 3 is an example among others of a block diagram showing alternative signal processing in a phone terminal 10 during and after switching to the listening assistance mode of operation, according to an embodiment of the present invention. The difference with FIG. 2 is the fact that there is a dedicated listening audio enhancement module 47 for processing the digital microphone signal 54 in the listening assistance mode which subsequently generates the enhanced audio signal 37. The switching mode signal 50 is then provided to the listening audio enhancement module 47 for activating its operation, and to the audio enhancement module 16 for disabling its operation.

Figure 4:
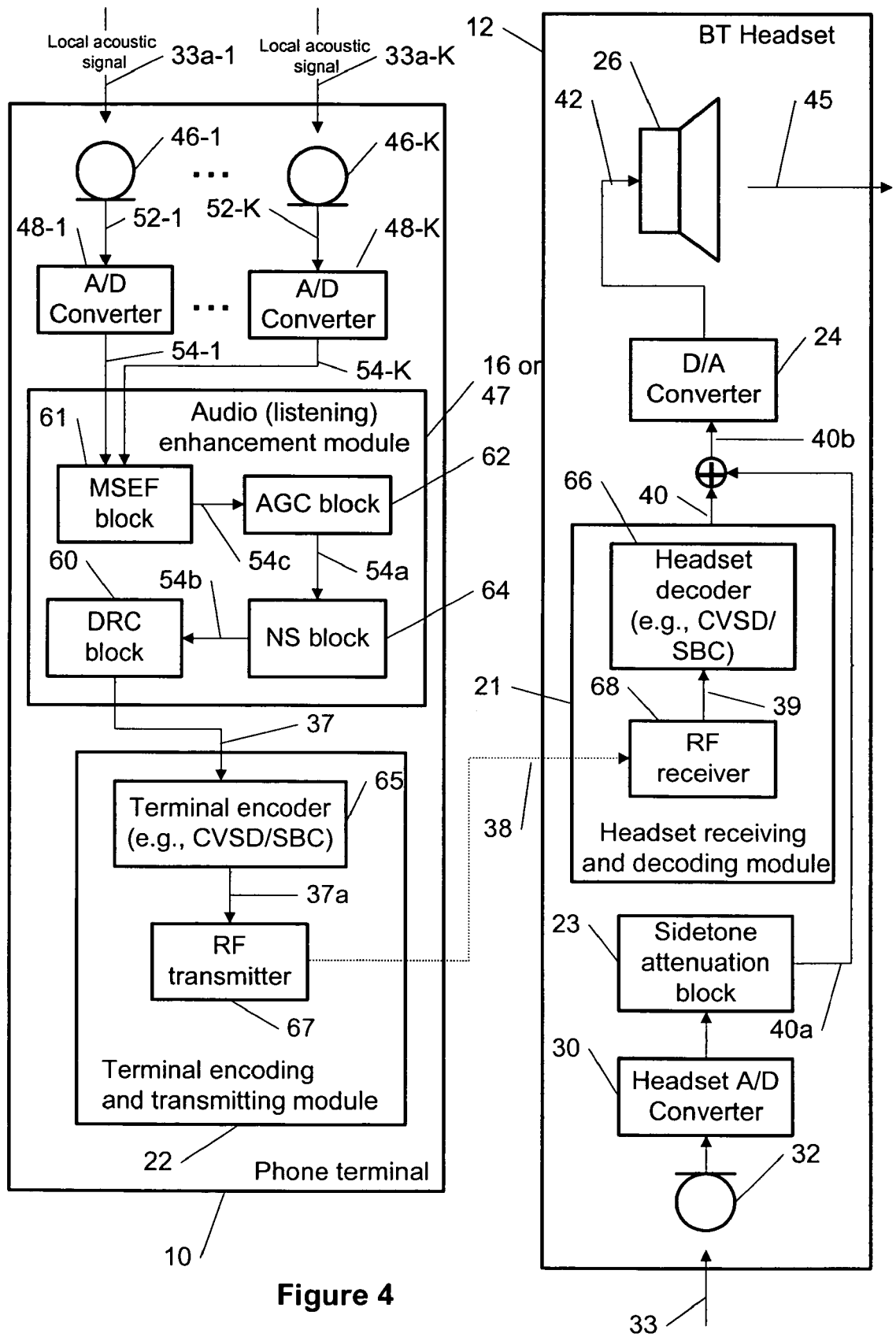
FIG. 4 is a block diagram showing detailed signal processing in a phone terminal and a headset after switching to a listening assistance mode of operation, according to an embodiment of the present invention.

FIG. 4 is an example among others of a block diagram showing detailed signal processing in a phone terminal 10 and a headset after switching to the listening assistance mode of operation.

According to an embodiment of the present invention, the audio enhancement module 16 or the listening audio enhancement module 47 can comprise: an automatic gain control (AGC) block 62 for providing an AGC microphone signal 54a in response to the digital microphone signal 54, a noise suppression (NS) block 64 for providing a noise suppressed microphone signal 54b in response to said AGC microphone signal 54a, and a dynamic range control (DRC) block 60 for providing the enhanced audio signal 37 in response to the noise suppressed microphone signal 54b. The block 16 or 47 can further comprise an optional multi-microphone speech enhancement front-end (MSEF) block 61 which provides the digital microphone signal 54 in response to digital microphone signals 54-1, 54-2, ..., 54-K processed by corresponding K A/D converters 48-1, 48-2, ..., 48-K in response to corresponding K microphone signals 52-1, 52-2, ..., 52-K from multiple microphones 46-1, 46-2, ..., 46K, respectively, wherein K is an integer of at least a value of one (e.g., K=1, 2, 3, 4, ..., etc.).

Furthermore, according to an embodiment of the present invention, the terminal encoding and transmitting block 22 can operate using the BLUETOOTH (BT) protocol and can comprise: a terminal encoder 65 for providing an encoded enhanced audio signal 37a in response to the enhanced audio signal 37, and an RF transmitter 67 for providing the RF signal 38 in response to said encoded enhanced audio signal 37a. Moreover, the terminal encoder 65 (following the BLUETOOTH protocol) can be, e.g., a continuous variable slope delta modulation (CVSD) encoder or a sub-band codec (SBC) encoder. The headset receiving and decoding module 21 has complimentary blocks to the blocks 67 and 65, respectively: an RF receiver 68 (for providing an audio receiver signal 39) and a headset decoder 66 (for providing the decoded audio signal 40) which again can be a continuous variable slope delta modulation (CVSD) decoder or a sub-band codec (SBC) decoder to match the performance of the terminal encoding and transmitting module 22.

Similarly to the example of FIG. 2, the sidetone attenuation block 23 can attenuate the output of the block 30 and provide the sidetone attenuation signal 40a which is added to the decoded audio signal 40 thus providing a combined decoded audio signal 40b to the block 24 and subsequently to the user for providing a feedback for controlling his/her voice.

Further according to an embodiment of the present invention, the switching between the listening mode and the phone mode can be provided by a mode switch block which can be located not only in the phone terminal 10 (as shown in FIGS. 2 and 3), but in the headset 12 as well, so the mode switch block can be located in the phone terminal 10, in the headset 12 or in both the phone terminal 10 and in the headset 12.

The total latency in the listening assistant system is a critical parameter. If the latency of the system is too long, the delay between the direct acoustic signal from the source and the processed acoustic replica (e.g., the output acoustic signal 45 in FIG. 4) becomes too long. As a result, the user perceives an echo, or disturbing reverberance in the speech signal. Therefore, the total latency from the microphone 46 in FIG. 2 or from the microphones 46-1, 46-2, ..., 46-K in FIG. 4 to the loudspeaker 26 should not be more than 10 to 20 ms. Amplification of the acoustic replica alleviates the echo problem as the louder acoustic replica (e.g., the output acoustic signal 45 in FIG. 4) masks (or weakens) the direct signal psychoacoustically.

It is known that feedback systems in general are stable only if the closed-loop gain is smaller than one at all frequencies. In our case, if the acoustic signal from the loudspeaker should leak back to the microphone, and therefore back to the closed-loop system, a phenomenon called acoustic feedback or howling (in practice it can be increasing in each cycle) would be perceived if the signal would be amplified in the closed-loop. In a normal use, the headset or hearing device is placed in the ear, and therefore the acoustic replica (e.g., the output acoustic signal 45 in FIG. 4), if leaked back to the microphone 46 or to the microphones 46-1, 46-2, ..., 46-K, becomes highly attenuated. Therefore no acoustic feedback or howling should be perceived during a normal operation. Optionally, feedback cancellation and feedback suppression (which could be implemented in the block 16 or 47) can improve the performance especially before the headsets are put on or after taken out of the ear(s).

An alternative embodiment of the present invention is such where the headset is replaced by a combination of a hearing aid and a device (e.g., a loopset device) which provides inductive audio coupling between the mobile phone and the hearing aid. The hearing aid must naturally then be equipped with a T-coil. The mobile phone can be attached to the aforementioned device, which provides the inductive audio coupling, with a wire or wirelessly by using e.g. BLUETOOTH. The signal 37 in FIG. 4 is in this embodiment of the invention (i.e., when the hearing aid is used instead of the headset) is fed to the loopset device. The loopset device couples the audio signal inductively to the hearing aid, which is switched to the T-mode. The loopset device may contain a microphone, which can be used for providing a sidetone, similarly as in the headset 12 in FIG. 4.

Still an alternative embodiment of the present invention is such where the headset is replaced by a hearing aid, which is able to receive a wirelessly transmitted audio signal, e.g., using BLUETOOTH.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising a user placing a mobile phone terminal near a local acoustic source in an ambient noise situation presenting a hearing challenge to said user in hearing said local acoustic source; said user switching a mode of the mobile phone terminal from a phone mode to a listening assistance mode; said mobile phone terminal transmitting to a headset, hearing aid, or earpiece worn by said user a transmitted signal generated by the mobile phone terminal in said listening assistance mode in response to a microphone signal from a microphone of said mobile phone terminal indicative of a local acoustic signal from said local acoustic source; and providing to the user an output acoustic signal by the headset, the hearing aid, or the earphone in response to said transmitted signal thus providing listening assistance in said ambient noise situation to the user in hearing said local acoustic signal in said listening assistance mode, wherein said switching of the mode of the mobile phone terminal to the listening assistance mode comprises: providing a listening command signal to a mode switch block of said mobile phone terminal; and providing, in response to said listening command signal, a switching mode signal to an audio enhancement module of the mobile phone terminal or to a listening audio enhancement module of the mobile phone terminal and providing said listening command signal optionally: to a receiving and decoding module of the mobile phone terminal, to said microphone or to an analog-to-digital converter of the mobile phone terminal.

2. the method of claim 1, wherein said mobile phone terminal provides said transmitted signal to said headset, hearing aid or earphone worn by the user wirelessly.

3. The method of claim 1, wherein said transmitted signal generated by the mobile phone terminal is in response to a microphone signal from a plurality of microphone signals from corresponding microphones of said mobile phone terminal indicative of said local acoustic signal from said local acoustic source.

4. The method of claim 1, wherein said headset, hearing aid, or earphone provides a sidetone signal to the user for a feedback for user voice control.

5. The method of claim 1, wherein said step of providing to the headset, hearing aid or earphone the transmitted signal comprises: providing a digital microphone signal by said analog-to-digital converter in response to said microphone signal; providing an enhanced audio signal by an audio enhancement module or by a listening audio enhancement module in response to said digital microphone signal; and providing said transmitted signal by a terminal encoding and transmitting block in response to said enhanced audio signal.

6. The method of claim 5, wherein said providing the enhanced audio signal by the audio enhancement module or by the listening audio enhancement module comprises at least one of:
   providing an automatic gain control microphone signal by an automatic gain control block in response to said digital microphone signal;
   providing a noise suppressed microphone signal by a noise suppression block in response to said automatic gain control microphone signal; and
   providing said enhanced audio signal by a dynamic range control block in response to said noise suppressed microphone signal.

7. The method of claim 5, wherein said providing of the transmitted signal by the terminal encoding and transmitting block comprises:
   providing an encoded enhanced audio signal by a terminal encoder in response to said enhanced audio signal; and
   providing said transmitted signal by a transmitter in response to said encoded enhanced audio signal.

8. The method of claim 7, wherein said terminal encoder is a continuous variable slope delta modulation encoder or a sub-band codec encoder.

9. The method of claim 8, wherein said continuous variable slope delta modulation encoder or said sub-band codec encoder uses a short range radio frequency protocol.

10. The method of claim 1, wherein said providing to the user of said headset, hearing aid, or earphone the output acoustic signal comprises:
    providing a decoded audio signal by a receiving and decoding module of said headset, hearing aid, or earphone in response to said transmitted signal;
    providing a digital audio signal by a digital-to-analog converter of said headset, hearing aid, or earphone in response to said decoded audio signal, and
    providing said output acoustic signal by a speaker of said headset, hearing aid, or earphone in response to said digital audio signal.

11. The method of claim 10, wherein said providing the decoded audio signal by the receiving and decoding module comprises:
    providing an audio receiver signal by a receiver in response to said transmitted signal; and
    providing said decoded audio signal by a terminal decoder in response to said audio receiver signal.

12. The method of claim 11, wherein said decoding module includes a continuous variable slope delta modulation decoder or a sub-band codec decoder.

13. The method of claim 12, wherein said continuous variable slope delta modulation decoder or said sub-band codec decoder uses a short range radio frequency protocol.

14. The method of claim 1, further comprising:
    switching the phone terminal to a phone mode back from said listening assistance mode.

15. The method of claim 1, wherein said switching from the phone mode to the listening mode is provided by a mode switch block of the phone terminal, by a mode switch block of the headset, hearing aid, or earphone or by both a mode switch block of the phone terminal and by a mode switch block of the headset, hearing aid, or earphone.

16. A computer program product comprising: a computer readable storage structure embodying computer program code thereon for execution by a computer processor with said computer program code wherein said code includes instructions for performing the method of claim 1.

17. A system, comprising: a mobile phone terminal, for placing near a local acoustic source in an ambient noise situation presenting a hearing challenge to a user of the mobile phone terminal in hearing said local acoustic source, for switching to a listening assistance mode, transmitting a signal in response to a microphone signal from a microphone of said phone terminal indicative of a local acoustic signal from said local acoustic source; and a headset, hearing aid, or earpiece, responsive to said transmitted signal, for providing to said user an output acoustic signal generated by said headset, hearing aid, or earpiece in response to said transmitted signal, thus providing listening assistance to the user in said listening assistance mode of said mobile phone terminal, wherein said switching to the listening assistance mode comprises: providing a listening command signal to a mode switch block of said mobile phone terminal; and providing, in response to said listening command signal, a switching mode signal to an audio enhancement module of the mobile phone terminal or to a listening audio enhancement module of the mobile phone terminal and providing said listening command signal optionally: to a receiving and decoding module of the mobile phone terminal, to said microphone or to an analog-to-digital converter of the mobile phone terminal.

18. The system of claim 17, wherein said mobile phone terminal is wirelessly connected with said headset, hearing aid, or earpiece.

19. The system of claim 17, wherein said microphone signal comprises a plurality of microphone signals from a corresponding plurality of microphones of said mobile phone terminal indicative of said local acoustic source.

20. The system of claim 17, wherein said headset, hearing aid, or earpiece provides a sidetone signal to the user for a feedback for user voice control.

21. The system of claim 17, wherein said phone terminal uses a short range radio protocol to encode said transmitted signal and said headsets, hearing aid, or earpiece uses said short range radio protocol to decode said transmitted signal.

22. A mobile phone terminal, comprising a mode switch block, responsive to a listening command signal for switching to a listening assistance mode, for providing in an ambient noise situation presenting a hearing challenge to a user of the mobile phone terminal in hearing a local acoustic source, in response to said listening command signal, a switching mode signal for switching to said listening assistance mode; and at least one microphone, responsive to a local acoustic signal from said local acoustic source, for generating at least one microphone signal indicative of a local acoustic signal which is used by said phone terminal for providing a transmitted signal to a headset, hearing aid, or earpiece for providing listening assistance to said user, wherein said transmitted signal is generated by said mobile phone terminal using said switching mode signal, wherein said switching of the mode of the mobile phone terminal to the listening assistance mode comprises: providing a listening command signal to a mode switch block of said mobile phone terminal; and providing, in response to said listening command signal, a switching mode signal to an audio enhancement module of the mobile phone terminal or to a listening audio enhancement module of the mobile phone terminal and providing said listening command signal optionally: to a receiving and decoding module of the mobile phone terminal, to said microphone or to an analog-to-digital converter of the mobile phone terminal.

23. The mobile phone terminal of claim 22, further comprising:
    an analog-to-digital converter, responsive to said microphone signal, for providing a digital microphone signal;
    an audio enhancement module or a listening audio enhancement module, responsive to said digital microphone signal and to said switching mode signal, for providing an enhanced audio signal; and
    a terminal encoding and transmitting block, responsive to said enhanced audio signal, for providing said transmitted signal.

24. The mobile phone terminal of claim 22, wherein said terminal encoding and transmitting block comprises:
    a terminal encoder, for providing an encoded enhanced audio signal in response to said enhanced audio signal; and
    a transmitter, for providing said transmitted signal in response to said encoded enhanced audio signal.

25. The mobile phone terminal of claim 24, wherein said terminal encoder is a continuous variable slope delta modulation encoder or a sub-band codec encoder.

26. The mobile phone terminal of claim 25, wherein said continuous variable slope delta modulation encoder or said sub-band codec encoder uses a short range radio protocol.

* * * * *